United States Patent Office 3,240,612
Patented Mar. 15, 1966

3,240,612
MEAT CURING COMPOSITION AND PROCESS
Bernard Wolnak, Highland Park, Ill., assignor to Meat Industry Suppliers, Inc., Northfield, Ill., a corporation of Illinois
No Drawing. Filed Aug. 12, 1963, Ser. No. 301,640
4 Claims. (Cl. 99—222)

This invention relates to improvements in meat curing compositions and more particularly to stable, rapid nitrate-nitrite curing compositions, pickling brines made therefrom, and to improved methods of pickling and curing meats by the use of the aforesaid curing compositions.

Brine curing compositions containing salt, a source of nitrite and nitrate ions and ascorbates or isoascorbates have been used extensively in meat curing operations in recent years. Meats treated with such curing agents are hams, bacons, corned beefs, sausages and other products wherein a stable, bright red color is desirable. The typical salt-nitrite-nitrate-ascorbate cure may be used either in dry form or more usually as a solution prepared from the dry mixture in which the various meats are stored or pickled.

While the typical curing composition employing these materials performed satisfactorily, there have been certain drawbacks which have been of concern to meat processors. One of these drawbacks was that instability of the cures and the pickles prepared therefrom resulted in variation of the nitrite and ascorbate content of the cure medium and consequent variability of the curing process. One procedure which was employed to stabilize to nitrite values of dry cures and pickling compositions is described in United States Patents No. 2,823,132 and No. 2,828,212. In these patents the method of achieving nitrite stability was based on regulation of the pH of solutions to maintain the compositions in aqueous solution at a particular pH level, i.e. 6.4 or 7.6, as minimum values. In addition, temperature was another variable which was controlled to prevent instability of the pickle-brine in the curing process.

The conventional salt-nitrite-ascorbate cures and pickle brines made therefrom by solution in water and addition of further salt may require from 5 to 21 days for complete curing. More rapid curing would therefore be desirable from the standpoint of reduced cost and greater production by the meat processor using existing equipment.

Another problem which is inherent in the use of these curing compositions is the discoloration, usually a darkening of the cut surfaces of a cured meat product. This discoloration takes place even when the meat is stored under refrigeration in the butcher shops, restaurant, or home. This darkening of the cut surface makes the outer layer unsightly or unsalable. It would therefore be desirable to provide a cure composition which would eliminate this drawback.

Products cured by the conventional salt-nitrite-ascorbate mix or pickling solution produces meat surfaces whose color is unstable to the action of sunlight, natural light, or the light emitted by ultraviolet lamps usually found in markets for overhead lighting and in display cases where the meats are stored. A curing composition providing cured meats whose surfaces would be stable to light, i.e not faded or darkened by such light, would therefore be advantageous. These new compositions produce meats which are stable to light.

The typical salt-nitrite-ascorbate cure may be used either in dry form by direct application to the meat surface or more usually by mixing with water and further amounts of salt to form a pickling bath.

The salt (NaCl) and the nitrate content of the curing composition are quite stable and are, in addition, of lesser significance in the curing process so that concern with these components is minimized. However, the nitrite and ascorbate contents must always be above minimal values. It has been found that in many instances the nitrite and ascorbate values of a cure composition will disappear rapidly especially when the pH of a solution of a cure composition is below 6.5 and the cure contains both nitrite and ascorbate. Thus Hollenbeck and Monahan (paper at June 13, 1955 meeting of Institute of Food Technologists) showed that a salt-nitrate-nitrite mixture, when stored at 80° F. and 65% relative humidity at pH 4.0, retained none of its original 0.25% nitrite and only 26% of the original 1.09% ascorbate after 7 days storage; when the pH of the mixture was at 5.7 the nitrite retained was 5% of the original 0.25% and the ascorbate retained was 39% of the original 1.09%. At pH 6.4 after 4 days 54% of this nitrite and 61% of the original ascorbate was retained.

Accordingly, and in view of the foregoing, it is an object of the present invention to provide a stabilized curing composition retaining its stability with respect to nitrite and ascorbate values either in the dry or pickle brine form over a prolonged period of time.

A further object is the provision of an improved curing composition which can be used to completely cure meats more rapidly than the conventional compositions of the prior art.

A still further object is the provision of an improved meat curing composition and process which can be used at low pH levels for rapid cure and at the same time provide the necessary nitric oxide content for the curing process.

Still another object is the provision of an improved meat curing composition which produces a cured meat product of superior color, flavor and keeping characteristics.

The fulfillment of these and other objects may be better understood by reference to the following specification and appended claims.

Accordingly, in one broad form the present invention comprises a stabilized meat curing composition containing sodium chloride, nitrite salts, asborbic acid and/or salts thereof, and citric acid, said composition, when dissolved in water at 1% solution by weight having a pH of less than about 6.5.

Still another form of the present invention is a method of curing meats which comprises soaking meat products in a curing brine containing sodium chloride, nitrite, ascorbate, and citric acid, maintaining said curing brine at a pH of less than about 6.5 during the curing period.

The nitrite salts and nitrate salts referred to herein are those of the alkali metals, particularly sodium and potassium, of which the most preferred is sodium. The ascorbate used in the present composition, pickling brines and process, are intended to include ascorbic acid and its alkali metal salts, sodium being preferred. Isoascorbic acid is also included within the term ascorbate.

As indicated above, the cure composition is so formulated that an aqueous 1% solution has a pH of less than 6.5, more particularly from about 4 to about 6.25, and preferably from 4 to 6. The pH may be regulated by the addition of various amounts of citric acid. Based on ascorbate content, the citric acid may be present in from 0.1 to 3 parts by weight per part of ascorbate. Buffering agents, such as sodium citrate, alkali metal bicarbonates, phosphates, tartrates and carbonates, may be used in conjunction with the citric acid additive to control pH.

Nitrate may also be used in the cure compositions and method of the present invention, but it is not absolutely necessary, particularly in the rapid cure operations, since the nitrite alone provides sufficient nitric oxide for complete curing of the meat products.

Spices conventionally used in such cures, i.e., allspice, ginger, garlic, cloves, bay, etc., may be added, depending upon the desired flavor of the product being cured.

It has been found that the curing compositions and pickling brines made therefrom are stabilized in the dry state and when incorporated into a pickling brine. By "stabilized" it should be understood that reference is made to the nitrite and ascorbate content of solutions made from the dry cure.

The cure compositions of this invention produce rapid cures of meat products, particularly in periods of from 1 to 3 days for complete curing, whereas conventional cures usually take from 5 to 14 days for completion. The quality of the cured product is also superior to that obtained by conventional cured products having excellent flavor and color. A particular advantage in the cured product resides in the fact that the color and texture of the meat is retained for long periods when stored under refrigeration or an ultraviolet light source.

While the compositions of this invention are adapted for rapid cures, it should be understood that they may be used for more extended curing, since the resulting pickle brines maintain their nitrite values for periods up to and beyond 21 days, which is adequate for any particular method.

The following examples will illustrate the various forms and embodiments of the invention as herein described.

The following example illustrates a specific meat curing composition of the present invention and its use in curing meats by conventional techniques. The composition contains the ingredients listed:

EXAMPLE 1

| Ingredients: | Parts by weight |
| --- | --- |
| Sodium nitrite | 2.5 |
| Sodium nitrate | 2.5 |
| Sodium isoascorbate | 2.0 |
| Citric acid | 2.0 |
| Sodium bicarbonate | 3.0 |
| Cane sugar (sucrose) | 8.0 |
| Salt (sodium chloride) | 80.0 |
| Total | 100.0 |

A 1% solution of the above composition in water had a pH of about 5.5 which is an optimum value.

Tap water was added to 0.4 pound of the above composition mixed with 0.3 pound of ordinary salt (granular) to make one gallon of solution. Samples of uncured pork round, beef brisket and ham were treated in the above curing pickles with the following results.

| Days of cure | Color of meat |
| --- | --- |
| 1 | Pinkish red. |
| 2 | Red. |
| 3 | Red. |
| 5 | Very red. |

The product, after curing for two days, was cooked, and had good color, flavor and texture. A control run, using a cure formulation similar to the above, but without citric acid had an initial pH of 7.5 (1% solution) and required five days for satisfactory curing. The flavor was inferior to the product cured using the composition of this invention. Storage of the product cured by the process of this invention under refrigeration showed superior retention of texture and color on cut surfaces even after seven days, whereas the control product was dry and darkened after less than one day.

The compositions of the present invention are stabilized with respect to nitrite and ascorbate in the presence of moisture. For example, the dry cure of Example 1, containing small amounts of water, showed essentially no loss of nitrite or ascorbate after twenty-one days, whereas a control without citric acid showed substantial deterioration of these values.

EXAMPLE 2

| Ingredient: | Parts by weight |
| --- | --- |
| Sodium nitrate | 2.5 |
| Sodium nitrite | 2.0 |
| Sodium ascorbate | 1.0 |
| Cane sugar—powdered | 8.0 |
| Sodium bicarbonate | 3.0 |
| Citric acid | 2.0 |
| Salt | 82.5 |

The above cure composition was mixed with salt and water in the same ratio as in Example 1, to produce a pickling brine. A 1% solution of the above dry mix had a pH of about 5.35 as compared with a control without citric acid, which had a pH of about 8. Comparative tests in curing of meat with the pickling brine of Example 2 for two days showed superior results in flavor and color as compared to meats cured for fourteen days using the control mix (without citric acid).

To compare the stability of the compositions of this invention with respect to nitrite and ascorbate values, the dry mix of the above example was stored for periods of up to 21 days and nitrite and ascorbate values determined periodically. The control was also evaluated in the same test. In addition, a small amount of water was added to the dry mix to show the effect on nitrite values. The results are shown in the following Table 1:

Sample A: Composition of Example 2
Sample B (control): Composition of Example 2 without citric acid
Sample C: Sample A with 1% water
Sample D: Sample B with 1% water

*Table 1*

| Sample No. | Nitrite, Percent | | | | Ascorbate, Percent | | |
| --- | --- | --- | --- | --- | --- | --- | --- |
| | Initial | After 7 days | After 14 days | After 21 days | Initial | After 14 days | After 21 days |
| A | 2.0 | 2.0 | 2.0 | 2.0 | 1.0 | 1.0 | 1.0 |
| B | 2.0 | 1.6 | 1.3 | 1.2 | 1.0 | 1.2 | 1.2 |
| C | 2.0 | 2.0 | 2.0 | -------- | 1.0 | 1.0 | 1.0 |
| D | 2.0 | 0.9 | 0.6 | 0.5 | 1.0 | 1.0 | 1.0 |

As may be seen from the above, the compositions of the present invention are useful in the production of cured meat products in a relatively short period of time, and produce a superior product.

The data in the table shows that the presence of citric acid, in addition to providing a rapid and superior cure, results in a stabilization of the nitrite and ascorbate values for a prolonged period of time.

It should be understood that while several specific embodiments of this invention have been illustrated, that many variations may be derived therefrom, such as for example, a varying of the amounts of nitrite, nitrate and ascorbate, the elimination of nitrate completely from the curing composition, and other modifications such as the addition of spices, flavoring agents, etc. to the curing composition, all of which are well known in the art.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. A dry meat curing composition for the rapid nitrite solution curing of meats, which is stabilized in the presence of moisture with respect to nitrite and ascorbate values, comprising salt, alkali metal nitrite in an amount to provide sufficient nitric oxide for complete cure of meat, alkali metal ascorbate and citric acid in an amount of from 0.1 to 3 parts per part of ascorbate, said composition being further characterized in that a 1% solution thereof has a pH of from 4 to 6.5.

2. A dry meat curing composition for the rapid nitrite solution curing of meats which is stabilized in the presence of moisture with respect to nitrite and ascorbate values, comprising salt, alkali metal nitrite in an amount to provide sufficient nitric oxide for complete cure of meat, alkali metal nitrate, alkali metal ascorbate and citric acid in an amount of from 0.1 to 3 parts per part of ascorbate, said dry cure composition being further characterized in that a 1% solution thereof has a pH of from 4 to 6.5.

3. A dry meat curing composition for the rapid nitrite solution curing of meats which is stabilized in the presence of moisture with respect to nitrite and ascorbate values comprising salt, alkali metal nitrite and alkali metal ascorbate in amounts sufficient to provide at least minimal values for the cure of meat products, a buffering agent, and citric acid in an amount of from 0.1 to 3 parts per part of ascorbate, said dry cure composition being further characterized in that a 1% solution thereof has a pH of from 4 to 6.5.

4. A rapid process for curing meats which comprises curing said meat with an aqueous solution containing salt, alkali metal nitrite and alkali metal ascorbate in amounts sufficient to provide at least minimal nitrite and ascorbate values for the cure of the meat product, and citric acid in an amount of from 0.1 to 3 parts per part of ascorbate, said curing being carried out at a pH of from 4 to 6.5 and said pH being regulated by the addition of a buffering agent, said curing process being further characterized by the relative stabilization of nitrite and ascorbate values during the curing period.

References Cited by the Examiner

UNITED STATES PATENTS

| | | | |
|---|---|---|---|
| 2,553,533 | 5/1951 | Komarik et al. | 99—159 |
| 2,739,899 | 3/1956 | Hollenbeck | 99—159 |
| 2,770,548 | 11/1956 | Hall et al. | 99—159 |
| 2,823,132 | 2/1958 | Sair | 99—159 |
| 2,828,212 | 3/1958 | Sair | 99—159 |
| 2,860,995 | 11/1958 | Sair | 99—159 |
| 2,977,235 | 3/1961 | Hanus et al. | 99—159 |
| 3,099,566 | 7/1963 | Flesch et al. | 99—159 |
| 3,154,421 | 10/1964 | Voegeli et al. | 99—159 |

OTHER REFERENCES

Food Technology, October 1956, pp. 500 to 503, article entitled "Sodium Ascorbate In Stabilizing Cured Meat Color," by R. L. Henrickson et al.

A. LOUIS MONACELL, *Primary Examiner.*

HYMAN LORD, *Examiner.*